(No Model.) 2 Sheets—Sheet 1.

H., C. & H. E. KUHLMANN.
MACHINE FOR CRACKING AND SHELLING NUTS.

No. 397,863. Patented Feb. 12, 1889.

(No Model.) 2 Sheets—Sheet 2.

H., C. & H. E. KUHLMANN.
MACHINE FOR CRACKING AND SHELLING NUTS.

No. 397,863. Patented Feb. 12, 1889.

Witnesses.

Inventor.

UNITED STATES PATENT OFFICE.

HEINRICH KUHLMANN, CARL KUHLMANN, AND HEINRICH ERNST KUHLMANN, OF GLÜCKSTADT, PRUSSIA, GERMANY.

MACHINE FOR CRACKING AND SHELLING NUTS.

SPECIFICATION forming part of Letters Patent No. 397,863, dated February 12, 1889.

Application filed November 26, 1888. Serial No. 291,868. (No model.)

*To all whom it may concern:*

Be it known that we, HEINRICH KUHLMANN, CARL KUHLMANN, and HEINRICH ERNST KUHLMANN, of Glückstadt, in the Kingdom of Prussia and Empire of Germany, have invented a new and useful Improvement in Machines for Cracking and Shelling Nuts, of which the following is a specification, reference being had to the accompanying drawings.

The object of this improvement is to provide for the cracking and shelling in rapid succession of nuts of various sizes without injuring the kernels.

We will proceed first to describe in detail a machine embodying our improvement, and then point out its novelty in a claim.

Figure 1:
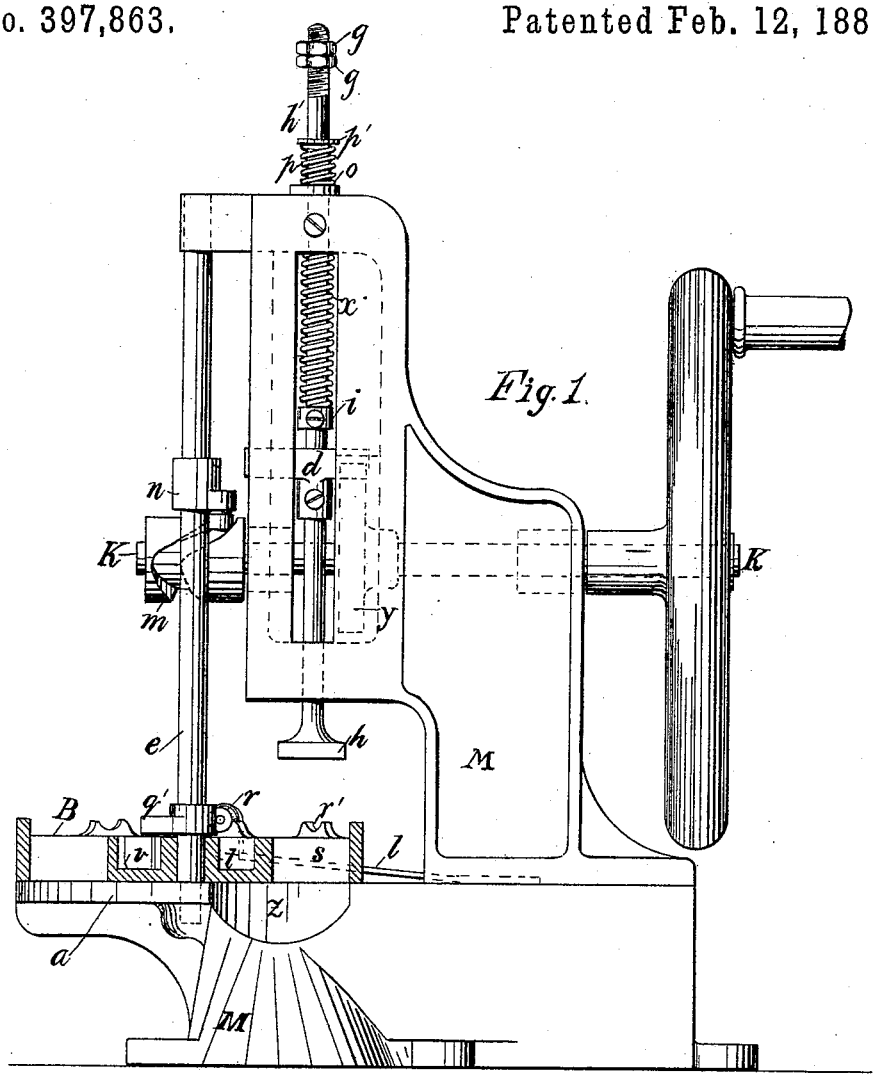
Figure 2:
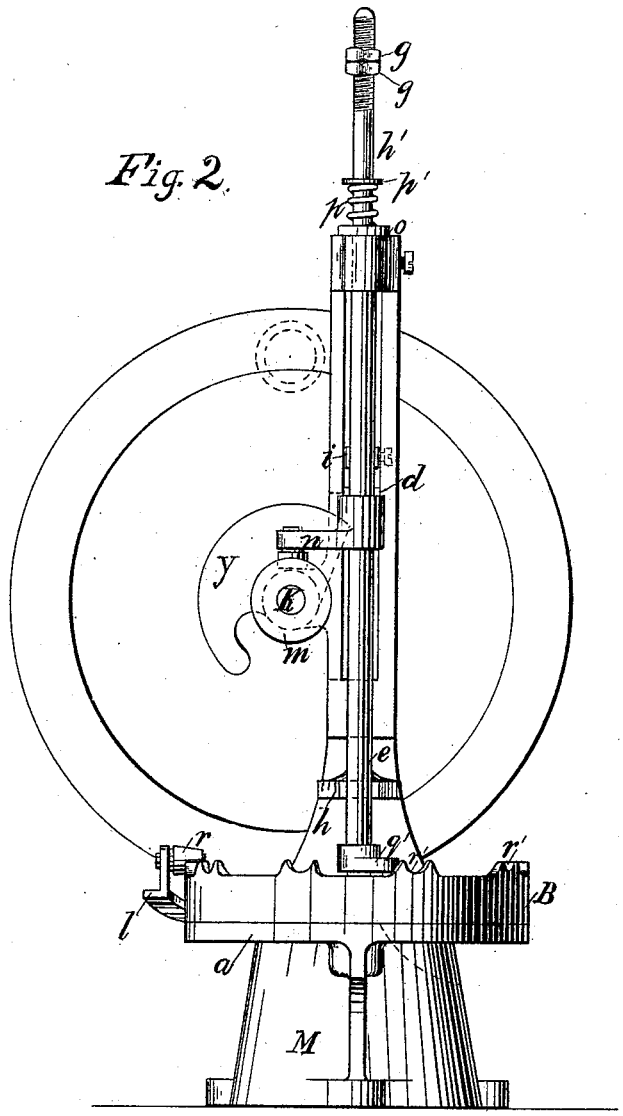

Figure 1 represents a side elevation of the machine, partly in section; Fig. 2, a front elevation, and Fig. 3 a plan thereof.

Similar letters of reference designate corresponding parts in all the figures.

Figure 3:
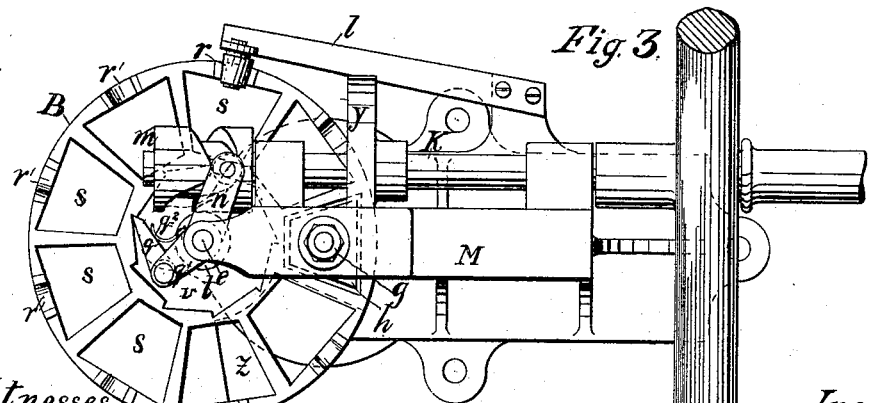

M designates an upright framing, the lower part of which is constructed to form a horizontal table, $a$. In the center of this table is journaled the lower end of an upright shaft, $e$, the upper end of which is journaled in a bearing on the upper part of the framing. This shaft has secured to it immediately above the table $a$ a disk-like frame, B, which lies close upon the horizontal table $a$. This disk or frame B, which is shown in section in Fig. 1, has in it a series of openings, $s$, at equal distances apart around its center. Within the circle of these openings there is provided around the hub $t$ of the said disk or frame B a cavity, $v$, the interior of which has ratchet-teeth around its circumference to receive a pawl, $q$. This pawl is shown in Fig. 3, but is omitted in Fig. 1 to expose the ratchet-teeth to view. The openings $s$ in the disk or frame B constitute chambers for the reception of the nuts to be cracked and shelled, the said chambers being each large enough for the largest nut.

The pawl $q$ is carried by an arm, $q'$, on the lower part of the upright shaft $e$, and is held to the ratchet-teeth of the cavity $v$ by means of a small spring, $q^2$, secured to the said arm $q'$. The partial rotary motion given to the upright shaft $e$ causes the disk or frame B to be rotated by the said pawl to bring the chambers $s$ consecutively under a hammer, $h$, which descends with an elastic force upon the nut underneath, in the manner hereinafter described, and breaks the nut upon the table $a$.

The hammer $h$ is formed or secured on the lower end of the upright rod $h'$, which works in a guide, $o$, at the top of the framing, which has firmly secured to it a guide-block, $d$, which works in upright guideways in the framing. Above the block $d$ there is adjustably secured to the rod $h'$ a collar, $i$, and between this collar and the guide $o$, at the top of the framing, a spring, $x$, is coiled around the rod $h'$. Above the guide $o$ there is another spiral spring, $p$, which rests upon the top of the said guide, and above which is a collar, $p'$, loosely fitted to the rod $h'$. The upper part of the rod $h'$ is screw-threaded and fitted with two nuts, $g$, which may be adjusted higher or lower upon the screw-thread and secured thereon in any position by jamming them together.

K is the operating-shaft of the machine, arranged horizontally in bearings on one side of the framing M and furnished with a cam, $y$, for operating on the block $d$ to lift the hammer, and with another cam, $m$, which operates upon an arm, $n$, on the upright shaft $e$ to produce the partial rotary movement of said shaft by which the pawl $q$ is worked to produce the rotation of the disk or frame B.

In the upper face of the disk or frame B, near the top thereof, is provided a series of notched projections, $r'$, and secured to the frame of the machine there is a strong spring, $l$, which carries a roller, $r$, which engages with a notch of one of the projections $r'$ whenever a chamber, $s$, is presented under the hammer $h$, and so retains the chamber and the nut therein in position during the stroke of the hammer. This spring $l$ yields to allow the rotation of the disk or frame B by the pawl $q$.

During every movement of the disk or frame B, by which a chamber, $s$, containing a nut, is brought under the hammer, the hammer is raised by the cam $y$, and the spring $x$ is compressed. As the nut arrives under the hammer the projection of the said cam passes the block $d$, and the hammer is sharply thrown down by the spring $x$ to crack the nut. The hammer is prevented from descending far enough to crush the kernel by the nuts $g$ striking upon the collar $p'$ and meeting the resistance of the spring $p$. This action of the spring $p$ is rendered very necessary by the very considerable variation of the size of the nuts. By the further movement of the disk or frame B the broken nut is pushed over an opening, $z$, in the table $a$, through which it falls out of the machine.

What we claim as our invention, and desire to secure by Letters Patent, is—

The combination, substantially as herein specified, in a machine for cracking and shelling nuts, of a table, $a$, a frame or disk, B, containing chambers for the nuts, arranged upon said table, a hammer, $h$, the two springs $p$ $x$, applied to the hammer, and means, substantially as herein described, for producing the rotation of the said disk or frame and for raising the hammer.

HEINRICH KUHLMANN.
CARL KUHLMANN.
HEINRICH ERNST KUHLMANN.

Witnesses:
W. A. KUNTZELMANN,
A. WILDERMUTH.